United States Patent
Gadau et al.

(10) Patent No.: US 10,487,771 B2
(45) Date of Patent: Nov. 26, 2019

(54) CYLINDER HEAD OF AN INTERNAL COMBUSTION ENGINE

(71) Applicant: Ford Global Technologies, LLC, Dearborn, MI (US)

(72) Inventors: Fabian Gadau, Ann Arbor, MI (US); Mark Michael Madin, Canton, MI (US); Joy Hines Forsmark, St. Clair Shores, MI (US); Lloyd E. Stanley, Canton, MI (US); John Cornell, Allenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 180 days.

(21) Appl. No.: 15/871,575

(22) Filed: Jan. 15, 2018

(65) Prior Publication Data

US 2019/0218995 A1    Jul. 18, 2019

(51) Int. Cl.
*F02F 1/40* (2006.01)
*F02F 1/00* (2006.01)
*B33Y 80/00* (2015.01)

(52) U.S. Cl.
CPC ............ *F02F 1/40* (2013.01); *F02F 1/002* (2013.01); *B33Y 80/00* (2014.12)

(58) Field of Classification Search
CPC ............ F02F 1/40; F02F 1/002; B33Y 80/00
See application file for complete search history.

(56) References Cited

U.S. PATENT DOCUMENTS

| 6,354,361 B1 | 3/2002 | Sachs et al. |
| 9,797,293 B2 | 10/2017 | Maki et al. |
| 2007/0029698 A1 | 2/2007 | Rynerson et al. |
| 2008/0092386 A1* | 4/2008 | Hildebrand ............. B22C 9/103 29/888.061 |
| 2015/0086408 A1 | 3/2015 | Kottilingam et al. |
| 2017/0050387 A1 | 2/2017 | Ederer |
| 2017/0067413 A1 | 3/2017 | Maki et al. |
| 2017/0203708 A1 | 7/2017 | Jaradi et al. |
| 2017/0254298 A1 | 9/2017 | Beyer et al. |
| 2017/0306831 A1 | 10/2017 | Craft et al. |

FOREIGN PATENT DOCUMENTS

| DE | 102017112216 A1 * | 10/2017 | ............ B22F 3/1055 |
| JP | 53-120634 | * 10/1978 | |
| RU | 2535187 C1 | 12/2014 | |

OTHER PUBLICATIONS

Plastics Today: Additive Manufacturing Takes Conformal Cooling to New Heights with PTC Creo, pp. 1-7; Jun. 25, 2015.
Robert Hofmann GmbH 3D Prints Production-Ready Cylinder Block for Volkswagon Automobile; Tyler Koslow; pp. 1-2; Sep. 29, 2016.

* cited by examiner

*Primary Examiner* — Kevin A Lathers
(74) *Attorney, Agent, or Firm* — Geoffrey Brumbaugh; Brooks Kushman P.C.

(57) ABSTRACT

An engine component includes stratified metal layers. The stratified metal layers form walls of a cylinder head having internal cavities defining a cooling jacket configured to direct coolant within and through the walls. The stratified metal layers also form a lattice disposed within and spanning between opposing surfaces of the cooling jacket configured to promote heat transfer between the stratified metal layers and coolant.

20 Claims, 5 Drawing Sheets

CYLINDER HEAD OF AN INTERNAL COMBUSTION ENGINE

TECHNICAL FIELD

This disclosure relates to a cylinder head of an internal combustion engine and cooling thereof.

BACKGROUND

Internal combustion engines may require cooling during engine operation based on heat produced by the in-cylinder combustion process. The engine may be formed from a cylinder block and a cylinder head that cooperate to define a cylinder.

The engine block and cylinder head may have various passages formed therein to provide coolant flow through the engine to control the temperature during operation. Often the fluid jackets or passages are integrally formed within the cylinder block (or crankcase) and/or cylinder head of the engine. The shape of the jacket and passages may be dependent on or limited by the manufacturing method used to form them.

SUMMARY

In at least one approach, an engine component is provided. The engine component may include stratified metal layers. The stratified metal layers may form walls of a cylinder head having internal cavities defining a cooling jacket configured to direct coolant within and through the walls. The stratified metal layers may also form a lattice disposed within and spanning between opposing surfaces of the cooling jacket configured to promote heat transfer between the stratified metal layers and coolant.

In at least one approach, an engine component is provided. The engine component may include a cylinder head including walls of stratified metal layers having internal cavities defining a cooling jacket configured to direct coolant within and through the walls. The engine component may further include a pillar of stratified metal layers disposed within and spanning between surfaces of the cooling jacket such that a body of the pillar may be spaced away from the surfaces to disturb flow of the coolant through the cooling jacket.

In at least one approach, a cylinder head is provided. The cylinder head may include cylinder head walls formed of stratified metal layers having internal cavities defining a cooling jacket configured to direct coolant within and through the walls. The cylinder head may further include a cupped partition formed of the stratified metal layers disposed within and spanning between surfaces of the cooling jacket such that a body of the cupped partition may be spaced away from the surfaces to redirect flow of the coolant within the cooling jacket.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
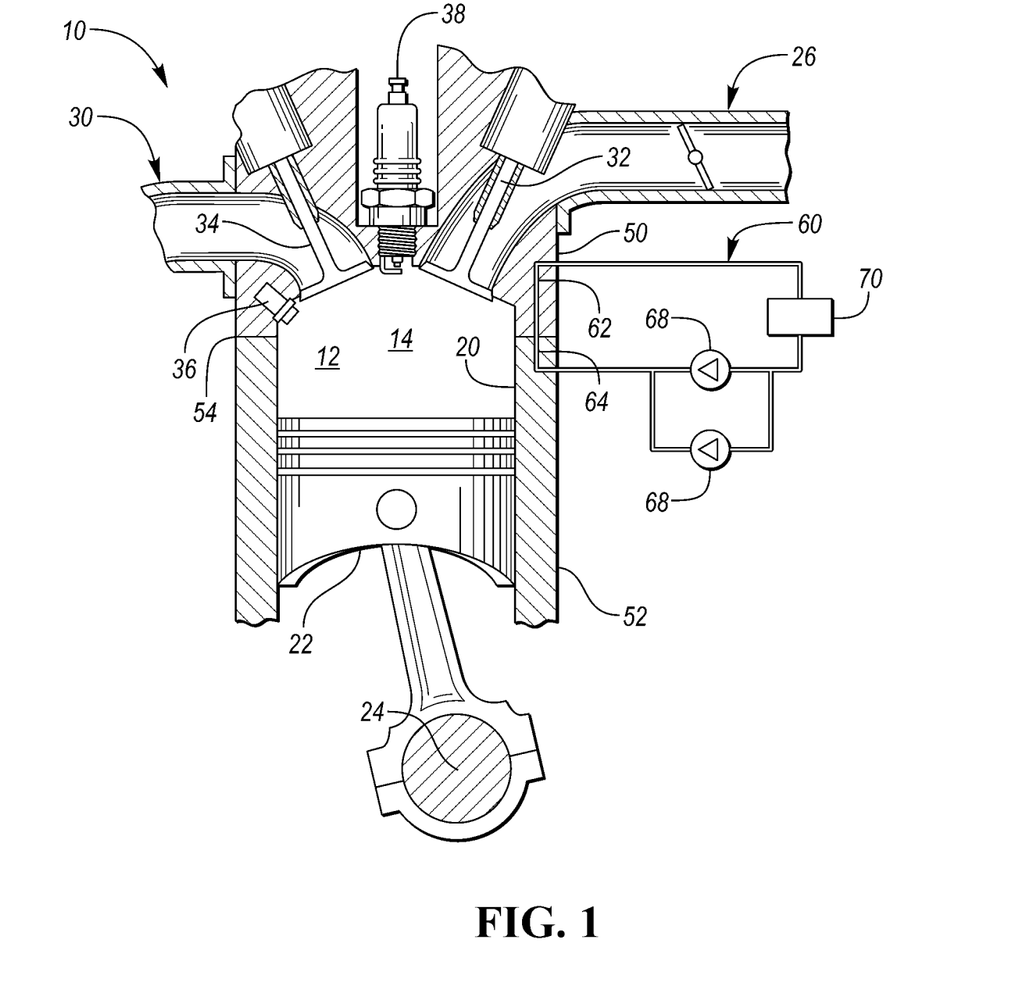
FIG. 1 illustrates a schematic of an internal combustion engine.

FIG. 1 illustrates a schematic of an internal combustion engine 10. The engine 10 may have any number of cylinders 12 (e.g., one or more), and the cylinders 12 may be arranged in various configurations. The engine 10 may have a combustion chamber 14 associated with each cylinder 12. The cylinder 12 may be formed by cylinder walls 20 and piston 22. The piston 22 may be connected to a crankshaft 36. The combustion chamber 14 may be in fluid communication with the intake manifold 38 and the exhaust manifold 40. An intake valve 32 may control flow from the intake manifold 38 into the combustion chamber 14. An exhaust valve 34 may control flow from the combustion chamber 14 to the exhaust system(s) 40 or exhaust manifold. The intake and exhaust valves 32, 34 may be operated in various ways as is known in the art to control the engine operation.

A fuel injector 46 may deliver fuel from a fuel system directly into the combustion chamber 14 such that the engine is a direct injection engine. A low pressure or high pressure fuel injection system may be used with the engine 10, or a port injection system may be used in other examples. An ignition system may include a spark plug 48 that may be controlled to provide energy in the form of a spark to ignite a fuel air mixture in the combustion chamber 14. The spark plug 48 may be positioned overhead or to one side of the cylinder 12. In other approaches, other fuel delivery systems and ignition systems or techniques may be used, including compression ignition.

The engine 10 may include a controller and various sensors configured to provide signals to the controller for use in controlling the air and fuel delivery to the engine, the ignition timing, the power and torque output from the engine, the exhaust system, and the like. Engine sensors may include, but are not limited to, an oxygen sensor in the exhaust system 40, an engine coolant temperature sensor, an accelerator pedal position sensor, an engine manifold pressure (MAP) sensor, an engine position sensor for crankshaft position, an air mass sensor in the intake manifold 38, a throttle position sensor, an exhaust gas temperature sensor in the exhaust system 40, and the like.

In some approaches, the engine 10 may be used as the sole prime mover in a vehicle, such as a conventional vehicle, or a stop-start vehicle. In other embodiments, the engine may be used in a hybrid vehicle where an additional prime mover, such as an electric machine, is available to provide additional power to propel the vehicle.

Each cylinder 12 may operate under a four-stroke cycle including an intake stroke, a compression stroke, an ignition stroke, and an exhaust stroke. In other embodiments, the engine may operate with a two stroke cycle. During the intake stroke, the intake valve 32 opens and the exhaust valve 34 closes while the piston 22 moves from the top of the cylinder 12 to the bottom of the cylinder 12 to introduce air from the intake manifold to the combustion chamber. The piston 22 position at the top of the cylinder 12 is generally known as top dead center (TDC). The piston 22 position at the bottom of the cylinder is generally known as bottom dead center (BDC).

During the compression stroke, the intake and exhaust valves 32, 34 may be closed. The piston 22 may move from the bottom towards the top of the cylinder 12 to compress the air within the combustion chamber 14.

Fuel may be introduced into the combustion chamber 14 and ignited. In the engine 10 shown, the fuel may be injected into the chamber 14 and may then be ignited using spark plug 48. In other examples, the fuel may be ignited using compression ignition.

During the expansion stroke, the ignited fuel air mixture in the combustion chamber 14 may expand, thereby causing the piston 22 to move from the top of the cylinder 12 to the bottom of the cylinder 12. The movement of the piston 22 causes a corresponding movement in crankshaft 36 and provides for a mechanical torque output from the engine 10.

During the exhaust stroke, the intake valve 32 may remain closed, and the exhaust valve 34 may open. The piston 22 may move from the bottom of the cylinder to the top of the cylinder 12 to remove the exhaust gases and combustion products from the combustion chamber 14 by reducing the volume of the chamber 14. The exhaust gases may flow from the combustion cylinder 12 to the exhaust system 40 as described below and to an after-treatment system such as a catalytic converter.

The intake and exhaust valve 32, 34 positions and timing, as well as the fuel injection timing and ignition timing may be varied for the various engine strokes.

The engine 10 may have a cylinder head 50 and a cylinder block 52 that cooperate with one another to form the combustion chambers 14. A head gasket (not shown) may be positioned between the block 52 and the head 50 to seal the chamber 14. The cylinder block 52 may have a block mating or deck face that corresponds with and mates with a head deck face of the cylinder head 50 along part line 54.

The engine 10 may include a fluid system 60. In one example, the fluid system 60 is a cooling system 60 to remove heat from the engine 10. In another example, the fluid system 60 is a lubrication system 60 to lubricate engine components.

For a cooling system 60, the amount of heat removed from the engine 10 may be controlled by a cooling system controller, the engine controller, one or more thermostats, and the like. The system 60 may be integrated into the engine 10 as one or more cooling jackets that are formed during an additive manufacturing process. In still other approaches, the system 60 may be integrated into the engine 10 as one or more cooling jackets that are cast, machined, or other formed in the engine. The system 60 may have one or more cooling circuits that may contain an ethylene glycol/water antifreeze mixture, another water-based fluid, or another coolant as the working fluid. In one example, the cooling circuit has a first cooling jacket 62 in the cylinder head 50 and a second cooling jacket 64 in the cylinder block 52. In one approach, the jackets 62, 64 may be in fluid communication with each other. In another approach, jacket 64 may be independently controlled and is separate from jacket 62. Coolant in the cooling circuit 60 and jackets 62, 64 may flow from an area of high pressure towards an area of lower pressure.

The fluid system 60 may have one or more pumps 68. In a cooling system 60, the pump 68 may provide fluid in the circuit to fluid passages in the cylinder block 52, and then to the head 50. The cooling system 60 may also include valves or thermostats (not shown) to control the flow or pressure of coolant, or direct coolant within the system 60. The cooling passages in the cylinder block 52 may be adjacent to one or more of the combustion chambers 14 and cylinders 12. Similarly, the cooling passages in the cylinder head 50 may be adjacent to one or more of the combustion chambers 14 and the exhaust ports for the exhaust valves 44. Fluid may flow from the cylinder head 50 and out of the engine 10 to a heat exchanger 70 such as a radiator where heat is transferred from the coolant to the environment.

Figure 2:
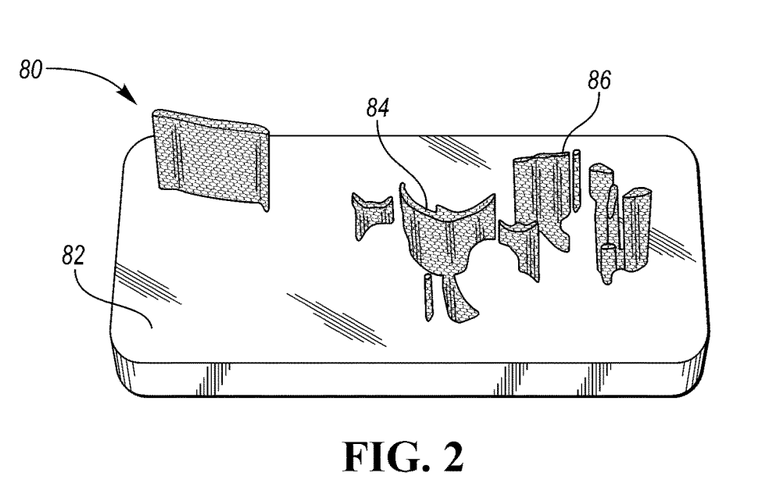
FIG. 2 illustrates a perspective view of support structures arranged prior to an additive manufacturing process.
Figure 3:
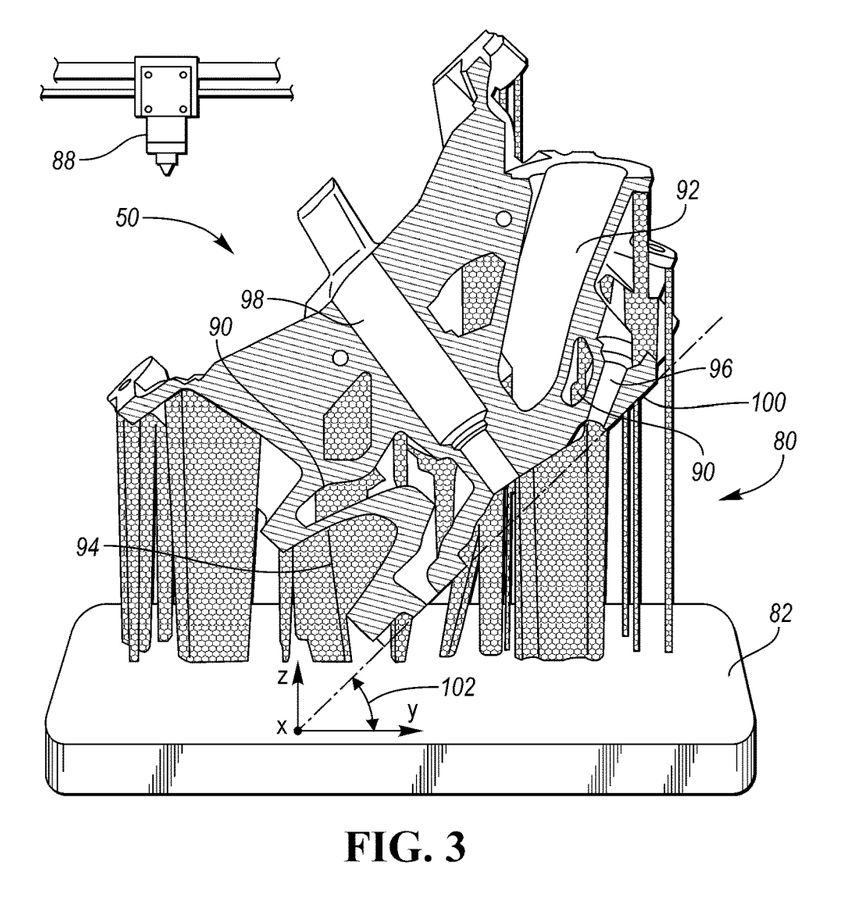
FIG. 3 illustrates a section view of a cylinder head formed by an additive manufacturing process.

Referring to FIGS. 2 and 3, a cylinder head may be formed by an additive manufacturing process. An additive manufacturing process, commonly referred to as three-dimensional (3D) printing processes, may be used to form objects by sequentially depositing material with a printer and subsequently hardening the deposited material to complete the part manufacturing process. A powder form metal or polymer material and binder may be deposited by a printer head on a 3-D printing machine bed that may be melted to soften the material and then solidified by applying heat or light. Different methods of solidifying the printed layers include selective laser melting (SLM), direct metal laser sintering (DMLS), selective laser sintering (SLS), fused deposition modeling (FDM), fused filament fabrication (FFF), stereo lithography (SLA), and laminated object manufacturing (LOM). Another approach is to extrude thin layers of molten material with an extruder that is later solidified. In this way, layers of metal powder may be printed onto a printing bed with additional layers of the powdered metal being applied to previously deposited layers. That is, a 3D object may be made by dividing the object into "2D" slices and building one slice at a time, one on top of another. While these slices or layers are referred to as "2D," each layer has a finite thickness, which may depend on the type of equipment used, the resolution of the equipment, or other factors.

The additive manufacturing process may utilize computer aided design (CAD) data or data from another electronic data source to produce 3D objects. The CAD may be provided to a 3D printer to produce objects directly from the CAD data.

The additive manufacturing process may include disposing one or more support structures 80 on a support surface 82. The support structures 80 may be formed of a material suitable for additive manufacturing, such as aluminum. The support structures 80 may be arranged so as to receive additive material to form predetermined portions of a to-be-formed component. For example, a given support structure may be sized and arranged on the support surface 82 to receive and support an exhaust port of the component.

In at least one approach, the support structures 80 include a solid wall structure such as a pillar 84. A pillar 84 may, for example, have a continuous wall surface along a height of the pillar 84. In this way, fluid coming into contact with the pillar 84 may not be permitted to pass through the pillar 84. In this way, the pillar 84 may act to divert fluid, as discuss in greater detail elsewhere herein.

The support structures may also include a wall structure such as a lattice 86. A lattice 86 may have a discontinuous wall surface along a height of the lattice 86. Moreover, the lattice 86 may define internal cavities or passages that may permit fluid communication between the outer faces of the lattice 86. In this way, the lattice 86 may receive fluid within the lattice 86 and may permit the fluid to pass therethrough, as also discussed in greater detail elsewhere herein.

Referring to FIG. 3, the additive manufacturing process may further include printing a cylinder head. The cylinder head shown in FIG. 3 may be the cylinder head 50 for use with the engine 10 as described above with respect to FIG. 1.

The cylinder head 50 may be formed using any suitable additive manufacturing process, including those previously discussed herein. In at least one approach, the cylinder head 50 may be formed of the same material as the support structures 80. For example, the cylinder head 50 may be formed of aluminum. It should be appreciated, however, that any metal that can be formed using additive manufacturing may be included in the cylinder head 50 and/or the support structures 80. Other non-limiting examples of metals that may be used include steel, titanium, magnesium, or alloys thereof.

The cylinder head 50 may be formed such that a print head 88 may move laterally in a plane defined by an X axis and a Y axis, and vertically in the direction of a Z axis. As used herein, the Z axis may be referred to as the vertical print axis.

During the additive manufacturing process, the cylinder head 50 may be formed such that it defines various grooves, channels, bores, or passageways. For example, the cylinder head 50 may include cooling jacket walls 90, intake port walls 92, exhaust port walls 94, fuel injector bore walls 96 for receiving a fuel injector (e.g., fuel injector 46), spark plug bore walls 98 for receiving a spark plug (e.g., spark plug 48), etc. In this way, a cylinder head 50 may include walls of stratified metal layers having internal cavities defining a cooling jacket configured to direct coolant within and through the walls.

As shown, the cylinder head 50 may be formed on the support surface 82 such that a bottom planar surface 100 of the of the cylinder head 50 is disposed at an oblique angle 102 relative to the plane formed by the X and Y axes. For example, the bottom planar surface 100 of the cylinder head 50 may be disposed at 35-degree angle 102 relative to the plane formed by the X and Y axes. In this way, an axis extending orthogonally to the bottom planar surface 100 (which may correspond to the vertical axis of the finished cylinder head 50) may extend at an oblique angle relative to the Z axis. Furthermore, stratified metal layers and a block mating surface of the cylinder head (e.g., which may refer to part line 54 of FIG. 1) may not be parallel. Rather, the stratified metal layers and the block mating surface of the cylinder head may be angularly offset at an angle of approximately 35 degrees.

After the print head 88 has completed printing the cylinder head 50, support structures 80 may be removed from the cylinder head 50. For example, support structures 80 disposed at external surfaces of the cylinder head 50 may be removed (for example, by machining, or by removing by hand). Other support structures 80 may remain. For example, and as will be appreciated, support structures 80 disposed within the various grooves, channels, bores, or passageways of the cylinder head 50 may remain within the cylinder head 50.

Figure 4:
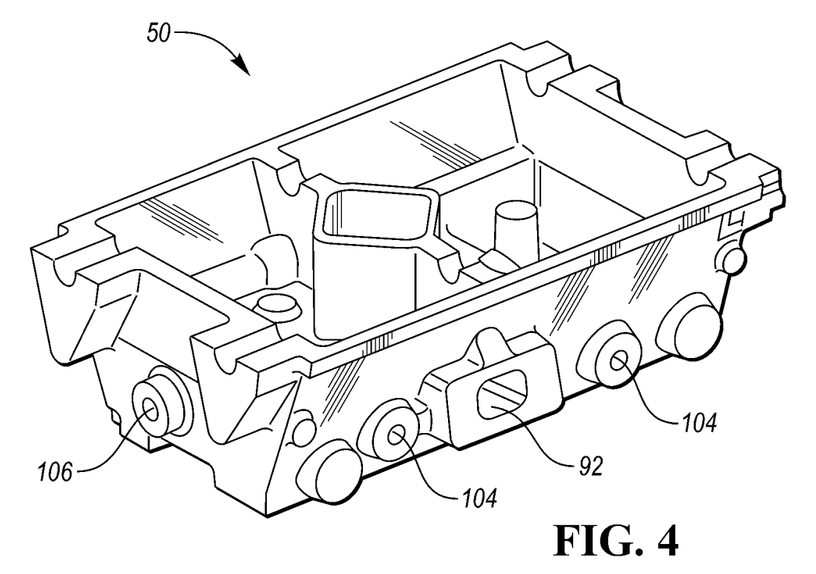
FIG. 4 illustrates a perspective view of a cylinder head.

FIG. 4 illustrates a perspective view of a cylinder head. The cylinder head may be formed, for example, by the additive manufacturing process described herein. The cylinder head may be the cylinder head 50 for use with the engine 10 as described above with respect to FIG. 1. The cylinder head 50 may include one or more coolant intake ports 104 and coolant output ports 106.

Figure 5:
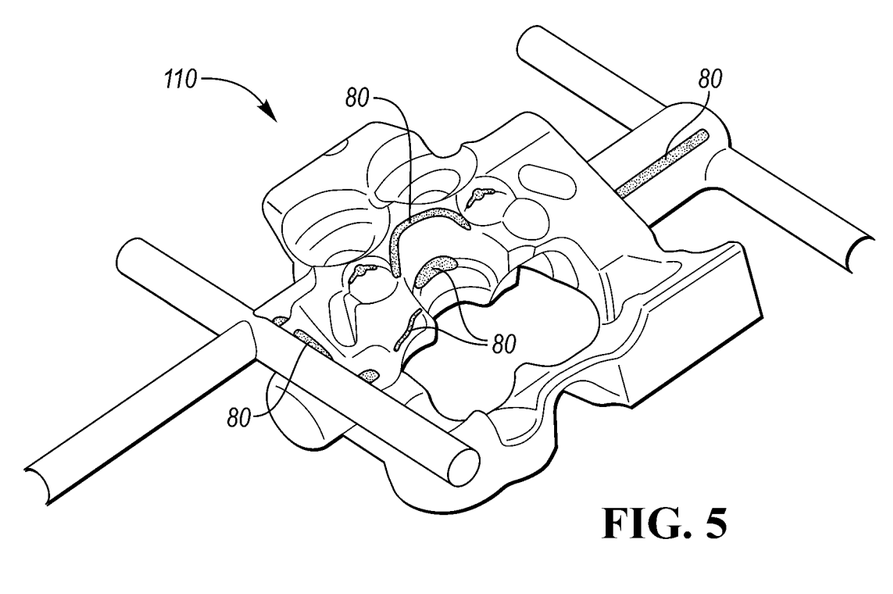
FIG. 5 illustrates a perspective view of a cooling jacket.

FIG. 5 illustrates a perspective view of a cooling jacket 110 for a cylinder head. The cylinder head may be the cylinder head 50 for use with the engine 10 as described above with respect to FIG. 1. The cooling jacket 110 may be generally designed to occupy a portion of the cylinder head 50 to distribute coolant therethrough in an open jacket configuration. The cooling jacket 110 as illustrated represents a negative view of corresponding passages within the cylinder head 50.

As discussed, certain support structures 80 may remain fixed within the cavities of the cylinder head 50.

Figure 6:
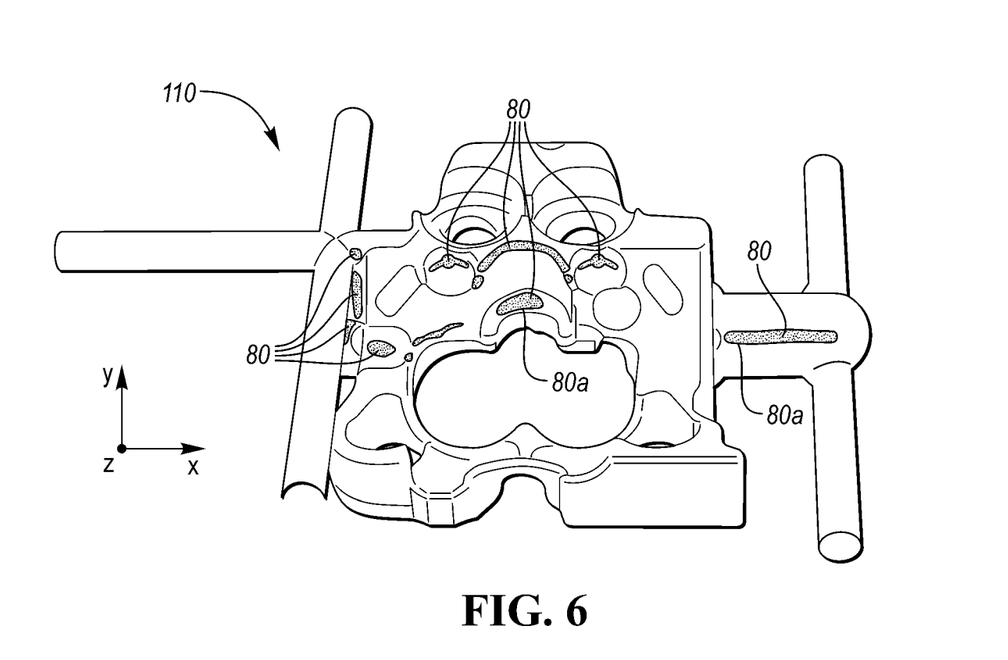
FIG. 6 illustrates a top plan view of the cooling jacket of FIG. 5.
Figure 7:
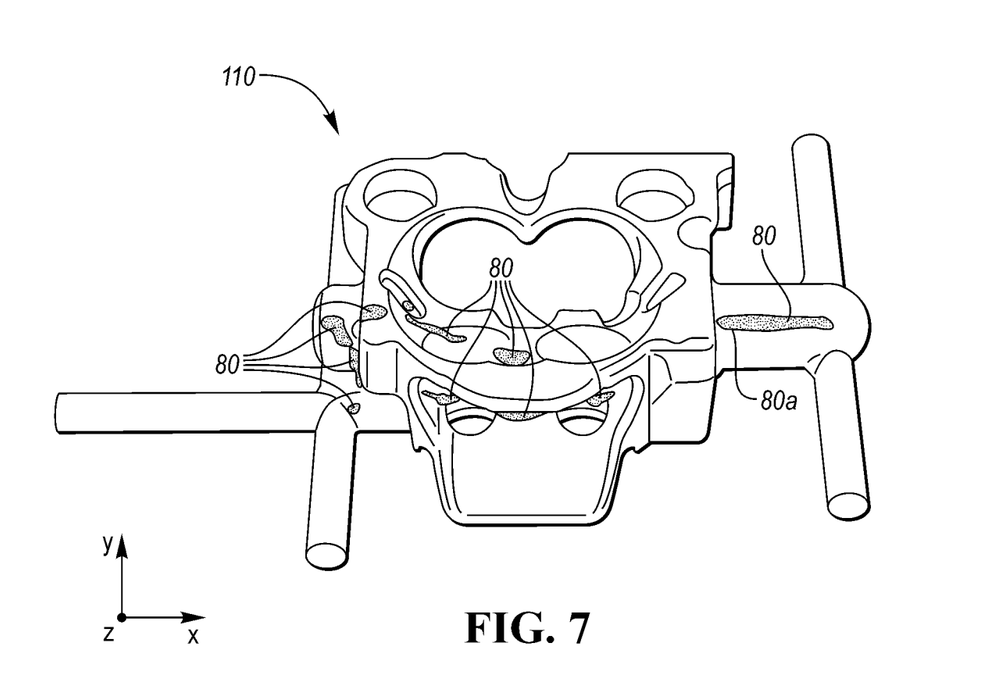
FIG. 7 illustrates a bottom plan view of the cooling jacket of FIG. 5.

FIGS. 6 and 7 illustrate the cooling jack 110 viewed along the Z axis of FIG. 3. One or more support structures 80 may extend through the cooling jacket 110 along the Z axis. For example, individual support structures 80 may define walls 80a extending parallel to the Z axis. In this way, an individual support structure 80 may define walls 80a extending parallel to walls 80a of another individual support structure 80.

The walls 80a may have continuous wall surfaces (such as when the support structure 80 is a pillar 84), or may have discontinuous wall surfaces (such as when the support structure 80 is a lattice 86). Any suitable combination of pillars 84 and lattices 86 may be provided.

Individual support structures 80 may various cross-sectional shapes in the X-Y plane. For example, the support structures may be elongated in the X-Y plane (e.g., in the X direction or the Y direction), may be rounded in the X-Y plane, etc.

The walls 80a of the support structures 80 disposed within the cavities of the cylinder head 50 may provide improved heat transfer when the cylinder head 50 is exposed to elevated temperatures and coolant is passed through the cooling jacket 50. For example, the support structures 80 provide additional surface area (as compared to empty cavities) for the coolant to pass over and draw heat. The increased surface area provided by the support structures 80 may also cause fluid to pass through the cooling jacket 110 at greater velocities, as compared to cooling jackets without the support structures 80. Furthermore, pillars 84 may be disposed in regions where it may be desirable to direct coolant toward an internal surface that may experience higher temperatures relative to other internal surfaces. Still more, lattices 86 may be provided to provide increased surface area where a complete diversion of fluid is not necessary.

Figure 8:
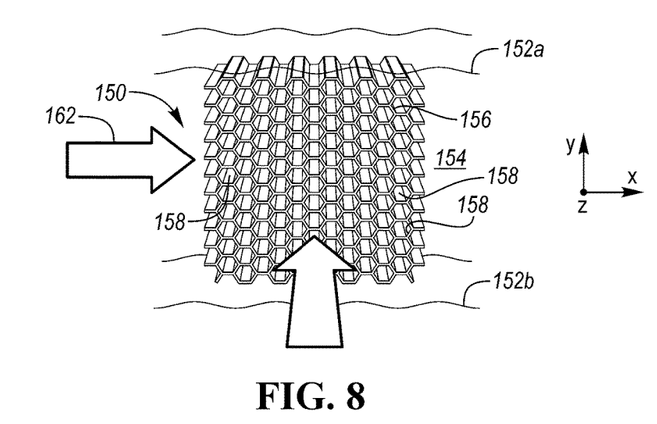
FIG. 8 illustrates an example lattice disposed within a cooling jacket.

Referring to FIG. 8, a lattice 150 is shown. The lattice 150 may be a support structure (e.g., support structure 80) as described herein, and may correspond to lattice 86. The lattice 150 may be disposed within, and may span between, opposing surfaces 152a, 152b of a cooling jacket 154. The lattice 86 may be configured to promote heat transfer between the stratified metal layers of the cooling head and that coolant interfaces the lattice 150. As shown in FIG. 8, the lattice 150 may be a planar lattice.

The lattice 150 may define a lattice face 156 having a plurality of apertures 158. The apertures 156 may be disposed such that the lattice 150 defines a honeycomb structure. In at least one approach, the face 156 of the lattice 150 faces a flow direction of the coolant, as indicated at arrow 160. In at least another approach, the face 156 of the lattice 150 does not face a flow direction of the coolant, as indicated at arrow 162.

Figure 9:
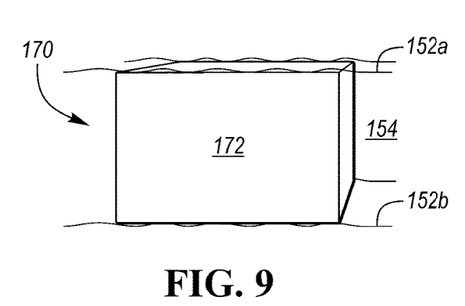
FIG. 9 illustrates an example pillar disposed within a cooling jacket.
Figure 10:
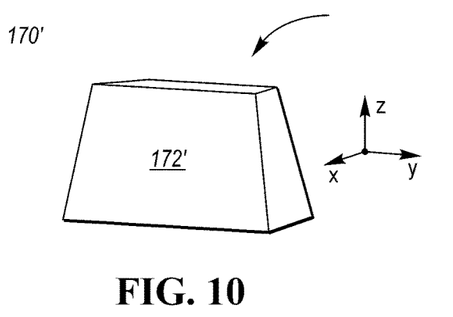
FIG. 10 illustrates another example pillar disposed within a cooling jacket.
Figure 11:
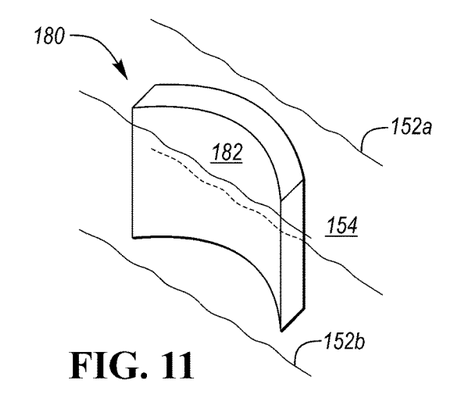
FIG. 11 illustrates an example cupped partition disposed within a cooling jacket.

Referring to FIG. 9, a pillar 170 is shown. The pillar 170 may be a pillar of stratified metal layers. The pillar 170 may be disposed within, and may span between, surfaces 152a, 152b of a cooling jacket 154. A body 172 of the pillar 170 may be spaced away from the surfaces to disturb flow of the coolant through the cooling jacket 154. The body 172 may be planar, may be curved, or may have a planar portion and a curved portion. As shown in FIG. 9, the body 172 may have a uniform thickness. Referring to FIG. 10, the pillar 170' may have a body 172' that has a variable thickness. More particularly, the body 172' may have a variable thickness along the X axis, the Y axis, the Z axis, or any combination thereof.

Referring to FIG. 9, a cupped partition 180 is shown. The cupped partition 180 may include stratified metal layers. The cupped partition 180 may be disposed within, and may span between, surfaces 152a, 152b of a cooling jacket 154. A body 182 of the cupped partition 180 may define an arcuate surface that may be spaced away from the surfaces to disturb flow of the coolant through the cooling jacket 154. More particularly, the arcuate surface may include a substantially impermeable wall, such that coolant may be directed or redirected to predetermined locations within the cooling jacket 154.

The cylinder head may include one or more lattices 150, one or more pillars 170, one or more cupped partitions 180, or any suitable combination thereof. Body portions of the lattices 150, pillars 170, and cupped partitions 180 may extend parallel to each other within the cooling jacket 154.

At least in part due to the cylinder head being formed from an additive manufacturing process, the cylinder head discussed herein may be provided with support structures. The cylinder head and the support structures may both be additive deposits. The support structures described herein may increase a flow rate within a cooling jacket. The structures may further add surface area within the cooling jacket, which may in turn promote increased heat transfer between the cylinder head and the coolant, as compared to a cooling jacket free of internal support structures.

In at least one approach, a method may include disposing a plurality of support structures on a surface. The support structures may be spaced from adjacent support structures. The method may further include forming, by an additive manufacturing process, a cylinder head having cavity walls that define a cooling jacket for receiving a fluid. The cylinder head may be formed such that a bottom surface (or engine block mating surface) extends at an oblique angle (e.g., 35 degrees) relative to the side surfaces of the support structures. At least portions of the plurality of support structures may extend within the cooling jacket. The method may further include removing at least a portion of the support structures that are not disposed within the cooling jacket. The method may further include introducing a coolant into the cooling jacket such that the coolant engages spaced apart support structures disposed and extending within the cooling jacket.

Although discussed herein with respect to cylinder head for an engine, the approaches provided may be applied to an engine block of an engine, another component of the vehicle which may include a cooling jacket for receiving a coolant, or any other suitable structure.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An engine component comprising:
stratified metal layers forming
walls of a cylinder head having internal cavities defining a cooling jacket configured to direct coolant within and through the walls, and
a lattice disposed within and spanning between opposing surfaces of the cooling jacket configured to promote heat transfer between the stratified metal layers and coolant.

2. The engine component of claim 1 wherein the lattice is planar.

3. The engine component of claim 1 wherein the lattice defines a face having a plurality of apertures.

4. The engine component of claim 3 wherein the lattice defines a honeycomb structure.

5. The engine component of claim 3 wherein the face of the lattice faces a flow direction of the coolant.

6. The engine component of claim 3 wherein the face of the lattice does not face a flow direction of the coolant.

7. The engine component of claim 1 wherein the stratified metal layers and a block mating surface of the cylinder head are not parallel.

8. An engine component comprising:
a cylinder head including walls of stratified metal layers having internal cavities defining a cooling jacket configured to direct coolant within and through the walls, and including a pillar of stratified metal layers disposed within and spanning between surfaces of the cooling jacket such that a body of the pillar is spaced away from the surfaces to disturb flow of the coolant through the cooling jacket.

9. The engine of claim 8 wherein the pillar is planar.

10. The engine of claim 8 wherein the pillar is curved.

11. The engine of claim 8 wherein the body has a uniform thickness.

12. The engine of claim 8 wherein the body has a variable thickness.

13. The engine of claim 8 wherein the stratified metal layers and a block mating surface of the cylinder head are not parallel.

14. A cylinder head comprising:
   cylinder head walls formed of stratified metal layers having internal cavities defining a cooling jacket configured to direct coolant within and through the walls; and
   a cupped partition formed of the stratified metal layers disposed within and spanning between surfaces of the cooling jacket such that a body of the cupped partition is spaced away from the surfaces to redirect flow of the coolant within the cooling jacket.

15. The cylinder head of claim 14 wherein the stratified metal layers are additive deposits.

16. The cylinder head of claim 15 wherein the stratified metal layers and a block mating surface of the cylinder head are not parallel.

17. The cylinder head of claim 14 wherein the cupped partition is a substantially impermeable wall adapted to redirect flow of the coolant within the cooling jacket.

18. The cylinder head of claim 14 further comprising:
   a pillar of stratified metal layers disposed within and spanning between surfaces of the cooling jacket such that a body of the pillar is spaced away from the surfaces to disturb flow of the coolant through the cooling jacket, wherein the body is spaced apart from the cupped partition.

19. The cylinder head of claim 18 wherein the body of the pillar extends parallel to the body of the cupped partition.

20. The cylinder head of claim 14 further comprising:
   a lattice disposed within and spanning between opposing surfaces of the cooling jacket configured to promote heat transfer between the stratified metal layers and coolant.

* * * * *